United States Patent
Solomon (10) Patent No.: US 9,846,075 B2
(45) Date of Patent: Dec. 19, 2017

(54) METHOD AND SYSTEM FOR LEAK DETECTION IN A PIPE NETWORK

(75) Inventor: David Solomon, Zihron Yacov (IL)

(73) Assignee: Aquarius Spectrum Ltd., Netanya (IL)

( * ) Notice: Subject to any disclaimer, the term of this patent is extended or adjusted under 35 U.S.C. 154(b) by 110 days.

(21) Appl. No.: 13/982,436

(22) PCT Filed: Jan. 30, 2012

(86) PCT No.: PCT/IL2012/050031
§ 371 (c)(1),
(2), (4) Date: Oct. 15, 2013

(87) PCT Pub. No.: WO2012/101646
PCT Pub. Date: Aug. 2, 2012

(65) Prior Publication Data
US 2014/0028459 A1  Jan. 30, 2014

Related U.S. Application Data

(60) Provisional application No. 61/437,638, filed on Jan. 30, 2011, provisional application No. 61/473,867, filed on Apr. 11, 2011.

(51) Int. Cl.
*G08B 21/00* (2006.01)
*G01H 11/08* (2006.01)
(Continued)

(52) U.S. Cl.
CPC ............ *G01H 11/08* (2013.01); *G01M 3/243* (2013.01); *G08B 21/18* (2013.01)

(58) Field of Classification Search
CPC ........ G01H 11/00; G01H 11/06; G01H 11/08; G01H 1/00; G01H 1/003; G01H 11/02;
(Continued)

(56) References Cited

U.S. PATENT DOCUMENTS 4,654,554 A * 3/1987 Kishi ................. H04R 1/22
                                              310/322
4,672,839 A * 6/1987 Takeuchi ............ G01L 23/222
                                              310/319
(Continued)

FOREIGN PATENT DOCUMENTS

CN       2150540 Y     12/1993
CN       2162654 Y      4/1994
(Continued)

OTHER PUBLICATIONS

Hunaidi et al, Detecting Leaks in Plastic Pipes, Feb. 2000, Journal AWWA, vol. 92, No. 2, pp. 82-94.*
(Continued)

*Primary Examiner* — Ryan Sherwin
(74) *Attorney, Agent, or Firm* — Foley & Lardner LLP (57) ABSTRACT

A method and device for leak detection and localization in at least a portion of a of fluid distribution system. At each of two or more locations, a position locator determines the location of the device and a vibration sensor generates a signal indicative of vibrations detected by the vibration sensor at the location. A processor calculates a parameter of the signal indicative of an average power of the signal at the location over a predetermined time period. For each location, the processor stores in a memory the location of the device and the value of calculated parameter, and then determines a location in the fluid distribution system where the calculated parameter has a maximum value satisfying a predetermined criterion.

6 Claims, 5 Drawing Sheets

(51) Int. Cl.
*G01M 3/24* (2006.01)
*G08B 21/18* (2006.01)

(58) Field of Classification Search
CPC ... G01H 9/00; G01R 9/00; G01R 9/04; G01R 9/08; G01L 9/0041; G01L 9/008; G01M 3/00; G01M 3/243; G01N 29/11; G01N 29/14; G01N 2291/044; G01N 2291/2634; G01S 7/521; G01V 1/181; H01H 35/144; B06B 1/045
USPC .......... 73/40, 40.5 R, 40.5 A, 592, 649, 650, 73/651, 652, 654, 661
See application file for complete search history.

(56) References Cited

U.S. PATENT DOCUMENTS

| | | | | |
|---|---|---|---|---|
| 4,966,031 | A | * | 10/1990 | Mochizuki ............. G01H 11/08 310/329 |
| 5,058,419 | A | * | 10/1991 | Nordstrom ............ G01M 3/243 367/125 |
| 5,233,874 | A | * | 8/1993 | Putty ................... G01P 15/0802 73/514.29 |
| 6,567,006 | B1 | | 5/2003 | Lander et al. |
| 6,789,411 | B2 | | 9/2004 | Roy |
| 7,360,413 | B2 | | 4/2008 | Jeffries et al. |
| 7,403,628 | B2 | * | 7/2008 | Murray ................. H04R 7/045 381/152 |
| 8,346,492 | B2 | * | 1/2013 | Yang ..................... G01M 3/243 702/48 |
| 2009/0044628 | A1 | * | 2/2009 | Lotscher ................ G01H 1/12 73/654 |
| 2009/0139336 | A1 | | 6/2009 | Trowbridge, Jr. et al. |
| 2011/0126630 | A1 | * | 6/2011 | Fraanje .................. F16F 15/02 73/654 |
| 2012/0118130 | A1 | * | 5/2012 | Field ..................... G10H 3/146 84/730 |

FOREIGN PATENT DOCUMENTS

| | | |
|---|---|---|
| CN | 201322756 Y | 10/2009 |
| EP | 1 371 962 A1 | 12/2003 |
| JP | 06-207880 | 7/1994 |
| WO | WO 98/50771 | 11/1998 |
| WO | WO 2006/041981 A2 | 4/2006 |

OTHER PUBLICATIONS

Measurement Specialties, Inc., Piezo Film Sensors Technical Manual, Apr. 2, 1999.*
International Search Report; PCT/IL2012/050031; Jul. 2, 2012; 5 pgs.
English-language translation of Office Action dated Jun. 20, 2016 in related Chinese Appl. 201280010959.2 (13 pgs.).

* cited by examiner

Response of Main System Mass

Fig. 7

METHOD AND SYSTEM FOR LEAK DETECTION IN A PIPE NETWORK

FIELD OF THE INVENTION

This invention relates to device and method for detecting leakage in a pipe system.

BACKGROUND OF THE INVENTION

The presence of a leak represents a loss of resources as well as an economic loss. In some cases, for example, when the fluid is a toxic or combustible material, the presence of a leak can create a dangerous situation.

Leaks can be detected in two general ways. The first is by detecting the substance that escapes the vessel. The second is by detecting certain leak-related properties such as pressure drops, acoustic emissions, volume balance changes and temperature changes.

When a leak occurs, the leak generates a vibration that propagates through the material of the pipe, through the fluid in the pipe, and through the media that is adjacent to the pipe and leak. The leak vibration and pipeline acoustic characteristics greatly depend on the dimensions and material of the pipes. If the pipeline is buried, the transmission characteristics also depend on the type of soil within which the pipeline is buried.

The frequencies indicative of water leakage in a metal pipe system are in the range of 400-1500 Hz. Acoustic methods are often used in leak detection and pipe inspection in water systems. In these methods, Piezo-electric vibration detectors, or accelerometers, are placed at one or more locations in the water system on pipes, the ground or on walls. The Piezo-electric detectors are constructed as a spring-mass system, having a relatively high resonance frequency and a flat response in the lower frequencies. The detector is usually designed to have a resonance frequency significantly above the frequencies indicative of water leakage, so that the frequencies used in water detection are in the flat, linear, response region of the detector.

U.S. Pat. No. 7,360,413 to Jefferies discloses a wireless water flow monitoring and leak detection system that includes a base station, a memory, and a central processing unit configured to control the operation of the system and to analyze stored data. Wireless flow sensor nodes are installed on a supply line of a water fixture in a facility having a plurality of water fixtures. The wireless flow sensor nodes can periodically read and store a data point corresponding to either a flow condition or a no flow condition occurring at the water fixture. Coordinator nodes wirelessly relay data to between the plurality of wireless flow sensor nodes and the base station. The base station is configured to determine whether a leak exists in any of the water fixtures.

U.S. Pat. No. 6,789,411 to Roy discloses an apparatus for detecting leaks in an underground water pipe. A hydrophone monitors water flowing along the pipe and an alarm signal is generated when a flow parameter is above a maximum value or below a minimum value. A radio transmitter transmits the alarm signal to a remote receiver.

SUMMARY OF THE INVENTION

The present invention provides a device and method for leak detection in at least a portion of fluid distribution system delivering a fluid such as water or gas to one or more recipients. The portion of the pipe network in which leak detection is to be performed may be, for example, part of a municipal pipe network, in which case, the pipe network would span a geographical region. As another example, the portion of the pipe network in which leak detection is to be performed may be confined to a single building. Some or all of the pipe network may be accessible, and some or all of the pipe network may be concealed, for example, buried underground or contained in a wall.

The device of the invention includes a vibration sensor such as a microphone and a locator that determines a location of the device at any time. The locator may include, for example, a device for receiving signals from a global position satellite (GPS) or an accelerometer.

In the method of the invention, the device is moved from one location to another and placed in contact with a pipe or a medium or substance surrounding a pipe element in the pipe network suspected for a leak. At each location, a processor of the device samples vibration signals generated by the vibration sensor over a predetermined time interval and calculates the average power in one or more predetermined frequency bands at each of two or more locations. The processor generates a graphical representation of the calculated average intensity at each location together with the location, and displays the graphical representation on a display screen. The graphical representation may be in the form of a map of the fluid distribution system showing the average power calculated at the different locations on the distribution system.

The invention also provides a vibration sensor that may be used, for example, in the vibration detector node. The vibration sensor of the invention includes a Piezo to membrane and one or more an inertial masses. An elastomeric layer is positioned between the inertial mass and the Piezo that provides damping and also functions as an adhesive between the inertial mass and the Piezo membrane.

Thus, in one of its aspects, the invention provides a device for leak detection and localization in at least a portion of a of fluid distribution system, the fluid distribution system including at least part of a pipe network, comprising:
  (a) a vibration sensor generating a signal indicative of vibrations detected by the vibration sensor;
  (b) a position locator configured to determine a location of the device;
  (c) a first processor having a first memory configured for each of two or more locations of the device, to
    calculate a parameter of the signal generated by the vibration sensor at the location over a predetermined time period, the parameter being indicative of an average power of the signal over the time period;
    determine the location of the device from the locator;
    store in the first memory a location of the device and the parameter calculated for the signal generated by the vibration detector at the location;
  (d) a second processor configured to determine a location where the calculated parameter has a maximum value satisfying a predetermined criterion.

In the device of the invention, the second processor may be the same as the first processor.

In the device of the invention, the locator may be selected, for example, from a device for receiving signals from a global position satellite, an accelerometer, and a video based platform using a video. The vibration sensor may be configured to be connected to a microphone connector of a portable device, such as a smart phone, PDA or laptop. In this case, any one or more of the locator, first processor and first memory may be contained in the portable device.

The device may further comprise a display device, in which case the second processor may be configured to display on the display device a graphical representation of the measured parameters at the two or more locations. The second processor may be located at a base station. The base station may be provided with a display device, in which case, the second processor may configured to display on the display device a graphical representation of the measured parameters at the two or more locations. The to device may be configured to communicate with the base station.

The second processor may be further configured to calculate by interpolation of the average power calculated for locations at which vibrational data were obtained vibration intensities at locations along the pipe network where vibrational data were not obtained. The graphical representation may be in the form of a map of the at least part of a pipe network indicating the value of the calculated parameter at two or more locations in the pipe network.

The first or second processor may be further configured to generate an alert if a leak is detected.

In another of its aspects, the invention provides a vibration sensor comprising:
 (a) a support
 (b) a Piezo membrane;
 (c) a first inertial mass;
 (d) a first vibrational damping elastomeric layer between at least one of the inertial masses and the Piezo membrane.

The vibration may further comprise a brass plate in contact with the Piezo membrane. The Piezo membrane and the elastomeric layer may be enclosed in a rigid vibration damped frame.

The vibration sensor may further comprise a second inertial mass, there being a second vibrational damping elastomeric layer between the first and the second inertial masses.

In another of its aspects, the invention provides a method for leak detection and localization in at least a portion of a of fluid distribution system, the fluid distribution system including at least part of a pipe network, comprising:
 (a) For each of two or more locations:
  generating a signal indicative of vibrations at the location;
 (b) generating a signal indicative of the location;
 (c) calculating a parameter of the vibration signal indicative of an average power of the signal over the time period;
 (d) display on a display device a graphical representation of the calculated parameter at each of the two or more locations.

The method of the invention may further comprise calculating by interpolation of the average power calculated for locations at which vibrational data to were obtained, vibration intensities at locations along the pipe network where vibrational data were not obtained. An alert may be detected when a leak is detected.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
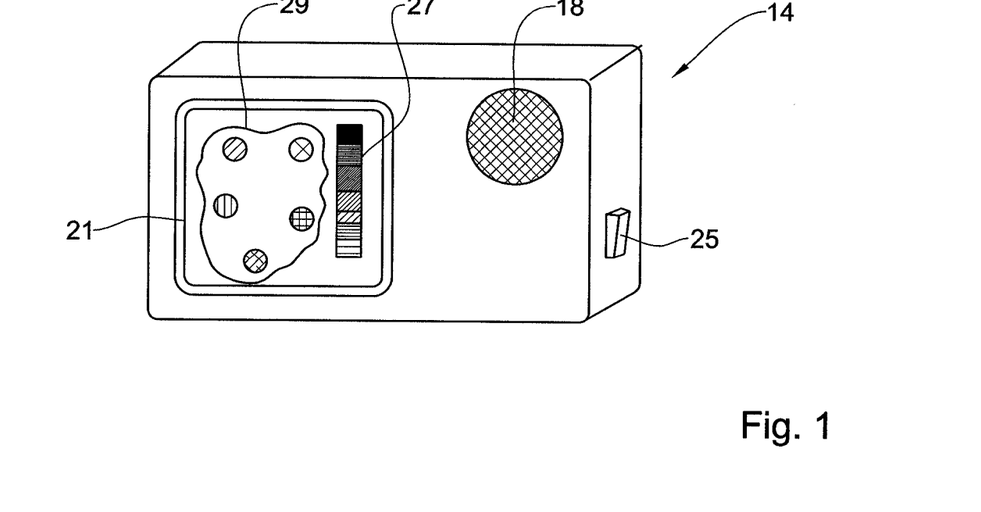
FIG. 1 shows a device for leak detection in a pipe network in accordance with one embodiment of the invention.
Figure 2:
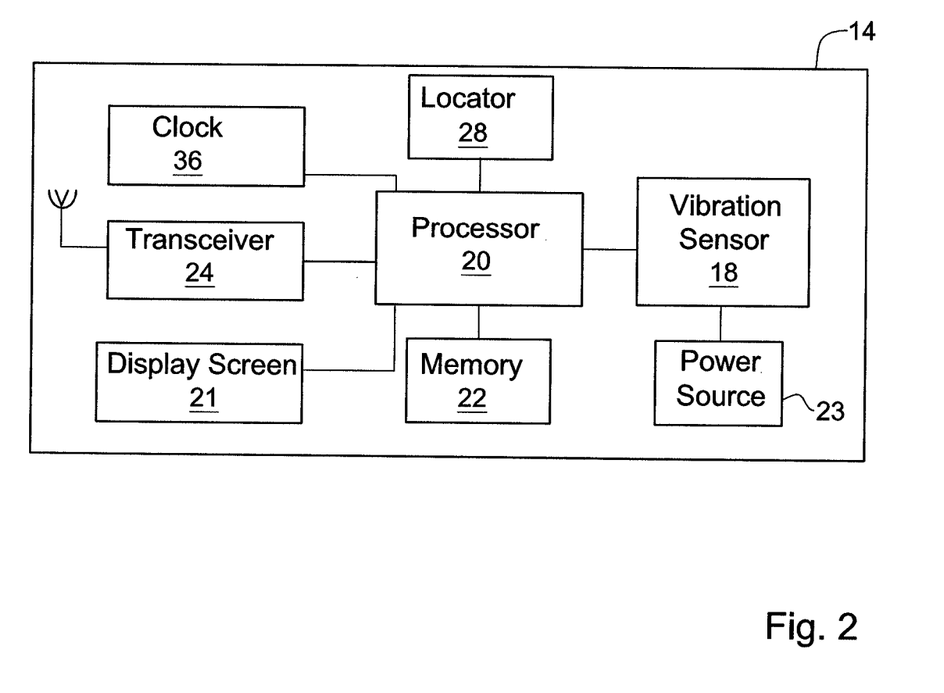
FIG. 2 shows schematically the device for leak detection of FIG. 1

FIGS. 1 and 2 show a device 14 for leak detection in at least a portion of fluid distribution system in accordance with one embodiment of the invention. The fluid distribution system includes a pipe network delivering a fluid such as water or gas to one or more recipients. The portion of the pipe network in which leak detection is to be performed may be, for example, part of municipal pipe network, in which case, the pipe network would span a geographical region. As another example, the portion of the pipe network in which leak detection is to be performed may be confined to a single building. Some or all of the pipe network may be accessible, and some or all of the pipe network may be concealed, for example, buried underground or contained in a wall.

The device 14 is shown schematically in FIG. 2. The device 14 includes a vibration sensor 18 such as a microphone or hydrophone that continuously or periodically picks up vibrations in the pipe network 12 adjacent to the detector. The to vibration sensor 18 can be a Piezo-electric accelerometer or geophone for liquid leak detection, or piezoelectric transducer for ultrasound vibration measurement for gas.

The device 14 also includes a processor 20 and associated memory 22 for analyzing vibration signals generated by the vibration sensor 18 and for storing data the data. The device 14 further includes a display screen 21 for displaying data.

The device 14 is further provided with a locator 28 that determines the location of the device at any time. The locator may include, for example, a device for receiving signals from a global position satellite (GPS). Alternatively, the node may be provided with an accelerometer, in which case, the position of the node relative to a fixed reference point may be determined by double integration of the accelerometer measurements. The locator may also be a video based platform using a built in camera that is configured to calculate absolute or relative position of the vibration sensor measurements.

The device 14 also includes a power source 23, that may be, for example, one or more batteries, preferably rechargeable batteries.

The device 14 is moved from one location to another. At each location, the processor 20 samples vibration signals generated by the vibration sensor 18 over a predetermined time interval. The sampling time may be, for example, in the range of 1-2 sec. Sampling of the signal at a given location may be initiated by a user pressing an activation button 25 on the device.

In the absence of a leak, the vibration sensor picks up environmental noise such as flow sounds, compressor and pump noises, and external sound sources such as trains and cars. Environmental noise may be removed from the recorded signal by appropriate band pass filtering. When a leak occurs, the leak generates a characteristic vibration that propagates through the material of the pipe, and through the fluid in the pipe, and is detected by at least one of the nodes.

The processor 20 calculates the average power of the vibration signal sample generated by the vibration detector 18 at the location in an appropriate frequency range. For example, for pipes buried in the ground, the appropriate frequency range may be 50-500 Hz, for pipes in a concrete floor this may be 500-2 kHz. The calculated average power is stored in the memory 22 together the location of the device the signal sample was obtained, as determined by the locator 28. The processor may also store in the memory the time of the sampling, as determined by an internal clock 36.

In one embodiment, the vibration sensor 18 is configured to be connected to a microphone connector of a portable device such as a smart phone, PDA or laptop. The portable device provides any one or more of a transceiver 26, clock 36, locator 28, processor 20 and memory 22.

After calculating the average power in a predetermined frequency band at each of two or more locations, the processor generates a graphical representation of the calculated average intensity and displays the graphical representation on the display screen 21. The displayed data may be in the form of a map 29 of the pipe network 12 in which the power intensity of the vibrations at the node locations along the pipe network is indicated, for example, by a color scale 27. The power intensity at other locations along the pipe network may be determined by interpolation of the intensities determined at the node locations. Generation of the map utilizes the device locations as determined by the locator 28.

The processor 20 may be further configured to interpolate the intensity data to calculate a vibrational intensity P(x,y) at locations where vibrational data were not collected, and to display the interpolated data on the map 29. The leak may be detected and located by finding a significant maximum of the vibrational intensity P(x,y). For example, a leak may be detected at a location (x,y) where P(x,y) is maximal, and this maximum is at least a predetermined constant, such as 2, times the variance of the calculated values of P(x,y).

In another embodiment of the invention, the device 14 communicates with a base station bay means of the transceiver 26. Communication between the nodes 14 and the base station 16 may be, for example, via radio frequency (RF) network, a computer server, satellite, the Internet, or wired or wireless telephone lines. In this embodiment, raw data obtained by the device 14 are transmitted to the base station which performs the data analysis and calculates the average power at each location and generates the map of the average power at locations. In this embodiment, two or more devices 14 may be used to collect vibrational data at different sets of locations. The data collected by the different devices are transmitted the base station which compiles the data received from the different devices, and generates a map of average power at all of the locations sampled by the different devices.

Any one or more of the vibration detector nodes may be provided with a navigation device that directs a user to a location in the pipe network where the to vibrational energy is maximal.

Figure 3:
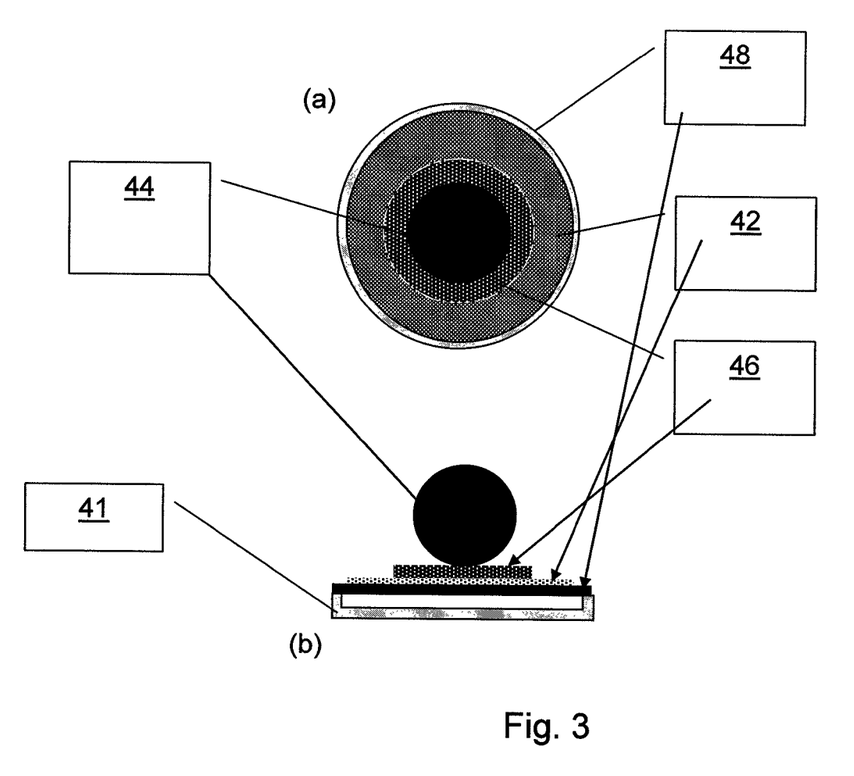
FIG. 3 shows a vibration sensor in accordance with one embodiment of the invention.

FIG. 3 shows a vibration sensor 40 that may be used as the vibration sensor 18 of the vibration detector node 14. The vibration sensor 40 is shown in a top view in FIG. 3a, and in a side view in FIG. 3b. The vibration sensor 40 has a bottom support 41 that may be made from any sturdy material, such as plastic or metal. The support 41 supports a brass disk 48. On top of the brass disk 48 is a disk shaped Piezo membrane 42 that may have, for example a diameter of about 25 mm. The detector 40 also includes an inertial mass 44 that may have a mass, for example, of 9 gr. An elastomeric layer 46 is positioned between the inertial mass 44 and the Piezo membrane 42 that may be made, for example, made from a modified silicone (MS) polymer. The elastomeric layer 46 provides damping and also functioned as an adhesive between the inertial mass 44 and the Piezo membrane 42.

Figure 4:
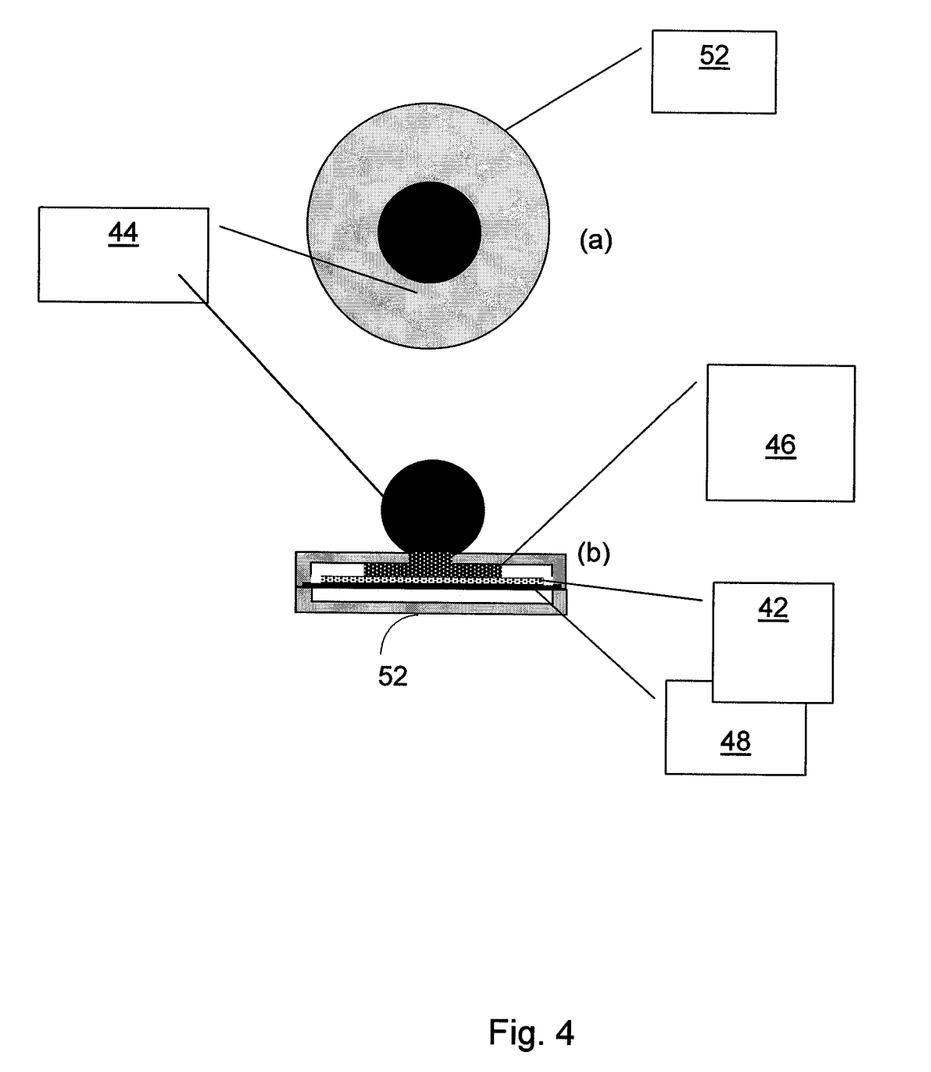
FIG. 4 shows a vibration sensor in accordance with a second embodiment of the invention.

FIG. 4 shows a vibration sensor 50 that may be used as the vibration sensor 18 of the vibration detector node 14. The vibration sensor 50 is shown in a top view in FIG. 4a, and in a side view in FIG. 4b. The vibration sensor 50 has several components in common with the vibration sensor 40 shown in FIG. 3, and components having similar components are shown in FIGS. 3 and 4 with the same reference numeral without further comment. In the vibration sensor 50, the brass disk 48, the Piezo membrane 42, and elastomeric layer are enclosed in a rigid vibration damped frame 52.

Figure 5:
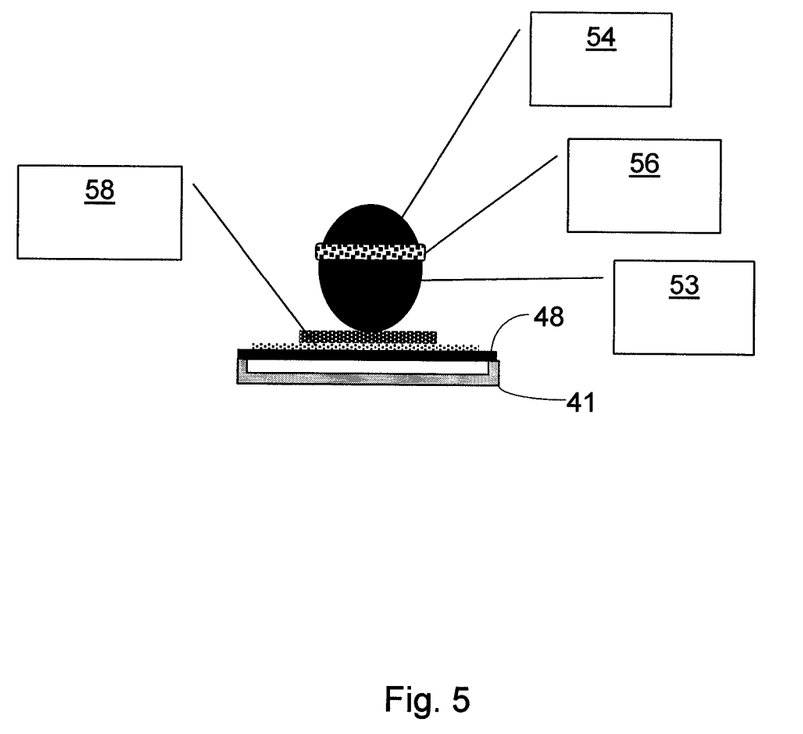
FIG. 5 shows a vibration sensor in accordance with third embodiment of the invention.
Figure 6:
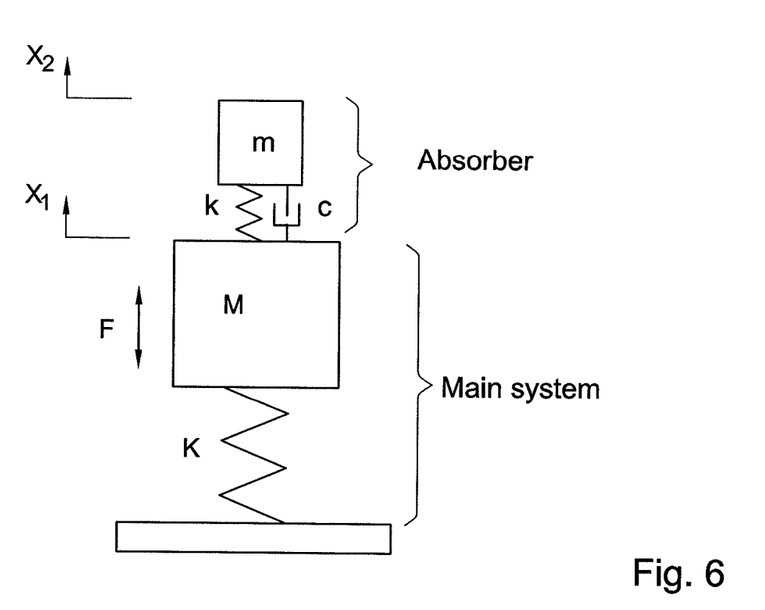
FIG. 6 shows a schematic diagram of the vibration sensor of FIG. 5.
Figure 7:
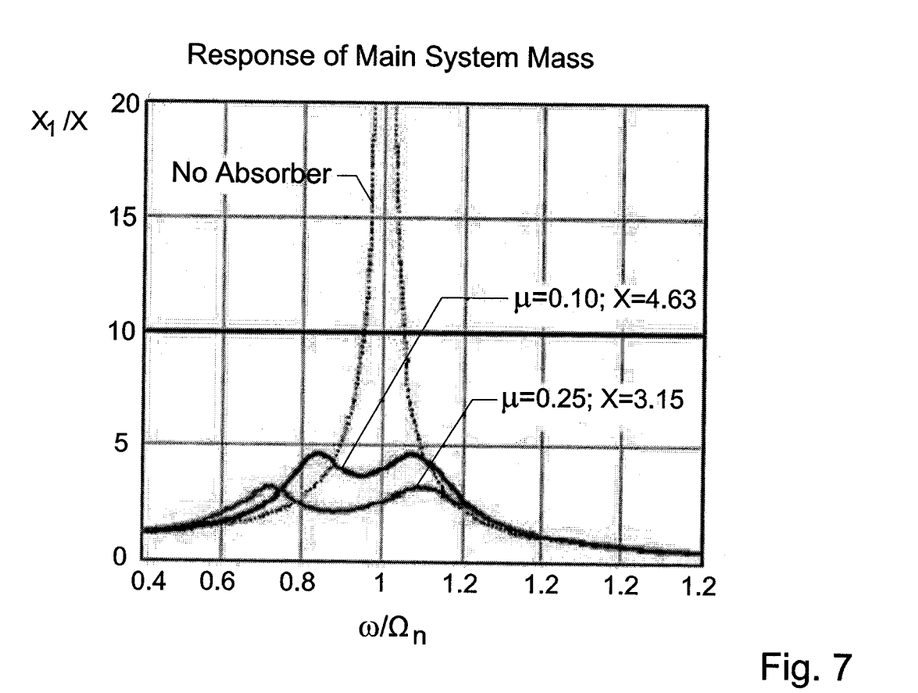
FIG. 7 shows the response of the vibration sensor of FIG. 5.

FIG. 5 shows a vibration sensor 60 that may be used as the vibration sensor 18 of the vibration detector node 14. The vibration sensor 60 is shown in a side view in FIG. 5. The vibration sensor 60 has several components in common with the vibration sensor 40 shown in FIG. 3, and components having similar components are shown in FIGS. 3 and 5 with the same reference numeral without further comment. The vibration sensor 60 comprises a first inertial mass 53 and a second inertial mass 54 that are separated by an elastic and damping layer 56. The first inertial mass 53 is separated from the brass disk 48 by elastomeric layer 58. Use of two inertial masses tends to increase the sensitivity of the detector in a wider range of frequencies with less damping and two resonance frequencies. The two-mass system has two natural frequencies:

$$W_1 = w_1 + w_2$$

$$W_2 = w_1 + w_2$$

where $w_1$ and $w_2$ is the natural frequency of the system comprising only the first and second mass, respectively. The behavior of the vibration sensor 60 can be described to by means of the schematic diagram shown in FIG. 6. The Elastomeric layer 56 is represented by a spring 70 and dashpot 72 in parallel, and Elastomeric layer 56 is represented by a spring 74. The response of this system is shown in FIG. 7.

The resonance frequency of the vibration sensor is preferably selected to be in the range of vibration frequencies indicative of water leakage which is in the range of 500-2000 Hz for metal pipes and 50-500 Hz for plastic pipes. The resonance frequency ($F_{res}$) of the vibration sensor can be calculated using Eq. 2:

$$F_{res} = \sqrt{\frac{k}{m}} \qquad (2)$$

where k is the elastic constant of the system and m is the inertial mass. The elastic constant k of the structure can be calculated by finite element methods or can be determined experimentally.

The sensitivity as a function of frequency is proportional to the transfer function and is basically given by a damped oscillator frequency response, where the damping is inversely proportional to the Q factor (the higher the damping of the system the lower the resonance and Q factor). The range of vibration frequencies of the vibration sensor may have a lower bound above a resonance frequency of the pipe system in the absence of any leakage. The determined range of vibration frequencies may have an upper bound below frequencies filtered out by the pipe system over a predetermined distance. The vibration detectors may have a Q value selected so that the sensor response in the determined range is above a predetermined value. For example, Q may be less than 10.

The invention claimed is:

1. A vibration sensor for detecting a leakage, comprising:
   (a) a support structure;
   (b) a Piezo membrane;
   (c) at least one inertial mass; and
   (d) an elastomeric layer that damps oscillations of the Piezo membrane,
   wherein the elastomeric layer is placed between the Piezo membrane and the at least one inertial mass and has a first side in contact with the Piezo membrane and a second side in contact with the at least one inertial mass, and
   wherein the vibration sensor has a resonance frequency range being in the range of vibration frequencies indicative of the leakage.

2. The vibration sensor according to claim 1, further comprising a metal plate in contact with the Piezo membrane.

3. The vibration sensor according to claim 1, further comprising a second inertial mass, wherein a second elastomeric layer is placed between the at least one inertial mass and the second inertial mass.

4. The vibration sensor according to claim 1, wherein the support structure is made of plastic or metal.

5. The vibration sensor according to claim 1, wherein the leakage comprises a water leakage.

6. The vibration sensor according to claim 1, having a Q factor that is less than 10.

* * * * *